United States Patent [19]

Messmer

[11] Patent Number: 5,773,795
[45] Date of Patent: Jun. 30, 1998

[54] ELECTRICALLY HEATABLE WARMING DEVICE

[75] Inventor: Robert Messmer, Kandel, Germany

[73] Assignee: David & Baader—DBK Spezialfabrik elektrischer Apparate u. Heizwiderstände GmbH, Kandel/Pfalz, Germany

[21] Appl. No.: 542,637

[22] Filed: Oct. 13, 1995

[51] Int. Cl.[6] .............................. F27D 11/02; A47J 27/21
[52] U.S. Cl. ........................................ 219/441; 219/439
[58] Field of Search ................................. 219/385–387, 219/429, 430, 433, 436, 438, 439, 441, 442; 392/441, 444; 99/493, 281, 323.3

[56] References Cited

U.S. PATENT DOCUMENTS

| | | | |
|---|---|---|---|
| 2,691,717 | 10/1954 | Huck . | |
| 3,551,644 | 12/1970 | Sano et al. | 219/441 |
| 3,725,643 | 4/1973 | Clausse | 219/441 |
| 3,845,274 | 10/1974 | Krenke et al. | 219/441 |
| 4,165,456 | 8/1979 | Dogliotti | 219/441 |
| 4,376,096 | 3/1983 | Bowen | 219/441 |
| 4,701,597 | 10/1987 | Braun et al. | 219/386 |
| 5,103,801 | 4/1992 | Herring et al. | 219/441 |
| 5,129,033 | 7/1992 | Ferrara et al. | 219/436 |
| 5,317,128 | 5/1994 | Yao | 219/443 |
| 5,539,185 | 7/1996 | Polster | 219/439 |

FOREIGN PATENT DOCUMENTS

| | | |
|---|---|---|
| 1 513 453 | 2/1968 | France . |
| 88 14 507 U | 2/1989 | Germany . |
| 444 417 | 9/1967 | Switzerland . |
| 2025206 | 1/1980 | United Kingdom . |
| 385463 | 1/1993 | United Kingdom . |

*Primary Examiner*—Teresa J. Walberg
*Assistant Examiner*—J. Pelham
*Attorney, Agent, or Firm*—Darby & Darby

[57] ABSTRACT

An electrically heatable warming device for warming up substances contained in a receptacle having a housing whose upper part is constructed as a cup for receiving therein a water bath, the receptacle to be introduced in said water bath. The bottom of the cup is a metallic heating plate and a heating element is at least one PTC resistance element arranged directly below the heating plate. A thermostat switch is provided for controlling the temperature and is connected to a heat-conducting member arranged laterally on the cup wall, the thermostat switch being arranged at a location where it is subjected to the direct influence of the heating element.

11 Claims, 7 Drawing Sheets

ELECTRICALLY HEATABLE WARMING DEVICE

BACKGROUND OF THE INVENTION

The present invention refers to an electrically heatable warming device for warming up substances contained in a receptacle.

When such warming devices are in operation, two requirements have to be fulfilled with regard to the heating process. On the one hand, the substance to be warmed up should rapidly be heated to the desired end temperature and, simultaneously, the end temperature should be kept within narrow temperature limits. This is difficult in the case of the warming device, since the substance is heated via a water bath and since a direct measurement of the temperature of the substance to be warmed up is normally not possible. Hence, conventional devices carry out an indirect temperature measurement in the course of which a sensor measures the temperature of the water bath. This measured value is predominantly used for deriving therefrom the temperature value for the substance to be warmed up. A problem arises due to the fact that, at least during heating up, the temperature of the substance to be warmed up "lags behind" the temperature of the water bath. This has the effect that, when a specific admissible temperature of the water bath has been reached, a control eleement will already switch off the heating, although the temperature of the substance to be warmed up is still much lower than the end temperature. Only at the end of a period of time in which a heat exchange takes place between the water bath and the substance to be warmed up, the water bath will cool down to such an extent that the controller will re-activate the heating.

This description of the heating process shows clearly that, in the case of a conventional warming device, the end temperature in the substance to be warmed up will only be reached after a comparatively long period of time.

If, however, the temperature of the water bath is allowed to overshoot the desired end temperature of the substance to be warmed up, more rapid heating will be achieved on the one hand, but, on the other hand, the fluctuation range of the end temperature will then be comparatively large, and this will result in inaccuracies of the adjusted end temperature.

BRIEF DESCRIPTION OF THE INVENTION

In accordance with the present invention, this object is achieved by a warming device having the features according to patent claim 1.

In this warming device, the bottom of the cup containing the water bath is a metallic heating plate, at least one PTC heating element being arranged below said heating plate. In addition, a heat-conducting member is arranged laterally on the cup wall and connected to a thermostat switch, which is arranged at a location close to the PTC heating element so that it is positioned in an area subjected to the direct influence of said heating element.

Due to the fact that the normally used resistance wire heating is replaced by a self-limiting PTC heating element, the well-known advantages during the heating period will be achieved, viz. high initial power when the heating element is in the cold condition, i.e. at room temperature, and self-controlling power characteristics as the temperature increases. Due to the fact that the PTC heating element is arranged below the metallic heating plate, a high heat transfer to the heating plate will be achieved as well as excellent decoupling of heat into the water bath.

A further characteristic feature of the solution according to the present invention is that the thermostat switch, which controls the activation and the deactivation of the heating element, is under the influence of two physical quantities. On the one hand, said thermostat switch is arranged such that it is located in an area subjected to the direct influence of the PTC heating element, whereby the thermal radition emitted will directly influence said thermostat switch, and, on the other hand, the temperature of the water bath will be fed back to said thermostat switch via the heat-conducting member arranged laterally on the cup wall. The second influencing quantity is supplied to the thermostat with delay, said delay resulting from the fact that the heat-conducting member can only feed back the temperature to which it has already been heated.

In order to sum up, it must be emphasized with regard to the solution according to the present invention that the controller has supplied thereto two measured-value actual signals with different weightings, whereby the advantageous operating characteristics of the warming device according to the present invention are obtained.

In an embodiment of the present invention which is simple to produce, the warming device is provided with a housing of plastic material whose upper component defines the lateral walls of the cup. In the conventional warming device, the heating power is supplied through the sidewalls by means of heating wires or the like provided at this location. This arrangement necessitates a double-walled structural design of the cup, the outer wall being used for the purpose of heat insulation so that as much heat energy as possible is supplied through the inner wall to the water bath in the interior of the cup. There can be no doubt about the fact that a cup having only one wall can be produced in a simple manner and by using only a small amount of material.

The lateral walls of the cup are preferably provided with ribs which project radially inwards and the length of which amounts preferably to one quarter of the diameter of the cup, said ribs being arranged at an axial distance of approx. 0.5 to 1.5 cm from the heating plate of the cup. The ribs are used as spacers between the metallic heating plate and the receptacle containing the substance to be warmed up. On the basis of the disclosed dimensions of the ribs, excessive local heating of the cup will be avoided and a good circulation of the water bath will be achieved.

In accordance with a preferred embodiment the heat-conducting member is inserted in a pocket formed axially in the cup wall, the thickness of the pocket side facing the inner side of the cup being preferably 1 mm. The metallic heat-conducting member is thus sufficiently insulated for complying with the electric safety regulations. In view of the fact that the heat-conducting member is not in direct contact with the water bath, but is heat-insulated by the layer of plastic material which has a thickness of 1 mm, said heat-conducting member will warm up only with a certain delay in comparison with the heating of the water bath, and this will improve the control behaviour of the thermostat switch.

The PTC element is preferably arranged between two contact sheets serving as electrodes, and the heating plate is placed on top of one of said contact sheets with an insulating foil extending between said heating plate and said contact sheet. This results in good heat transfer with low losses.

In accordance with an advantageous embodiment, the contact sheets are pressed towards one another and held in intimate contact with the heating plate by means of a sheet-metal spring which rests on the housing, and this will improve the thermal contact between the heating element and the heating plate still further.

In the case of a simple and stable embodiment of the sheet-metal spring, said sheet-metal spring has two opposed, bent longitudinal edges whose end portions are snapped in position in the upper housing component. Furthermore, the area located between said longitudinal edges has a plurality of bent-out flexible tongues so as to produce a contact pressure between the contact sheets and the PTC heating element.

The thermostat switch is preferably provided with a bimetal spring element which is connected to the heat-conducting member and which is arranged such that said PTC heating element and said bimetal spring element are located at a distance of approx. 2 cm from one another. The thermostat switch is thus mechanically held by the heat-conducting member, whereby additional holding elements for said thermostat switch can be dispensed with. The above-mentioned distance between said bimetal spring element and the heating element will cause a good control behaviour of the thermostat switch.

In accordance with a preferred embodiment of the present invention, a temperature measuring element is attached to the outer wall of the cup in thermal contact with the wall of said cup. The single-walled structural design of the sidewalls of the cup offers the possibility of arranging a temperature measuring element in close thermal contact with the cup wall. When suitably adjusted, a temperature measuring element arranged in this way will indicate a temperature corresponding essentially to the temperature of the substance to be warmed up. The user will thus have the possibility of visually checking the resultant temperature continuously.

The temperature measuring element is preferably a temperature-indicating paint foil by means of which the temperature distribution across a section of the cup wall can be indicated. On the basis of this structural design of the temperature measuring element, an even more exact simulated measurement of the temperature of the substance to be warmed up can be achieved.

In accordance with an embodiment which has been improved still further, a metal strip is arranged between the cup wall and the temperature measuring element, whereby a very precise temperature measurement will be achieved.

BRIEF DESCRIPTION OF THE DRAWINGS

The gist of the present invention will be disclosed even more clearly by the description of a preferred embodiment on the basis of the drawings enclosed, in which.

DETAILED DESCRIPTION OF THE INVENTION

Figure 1:
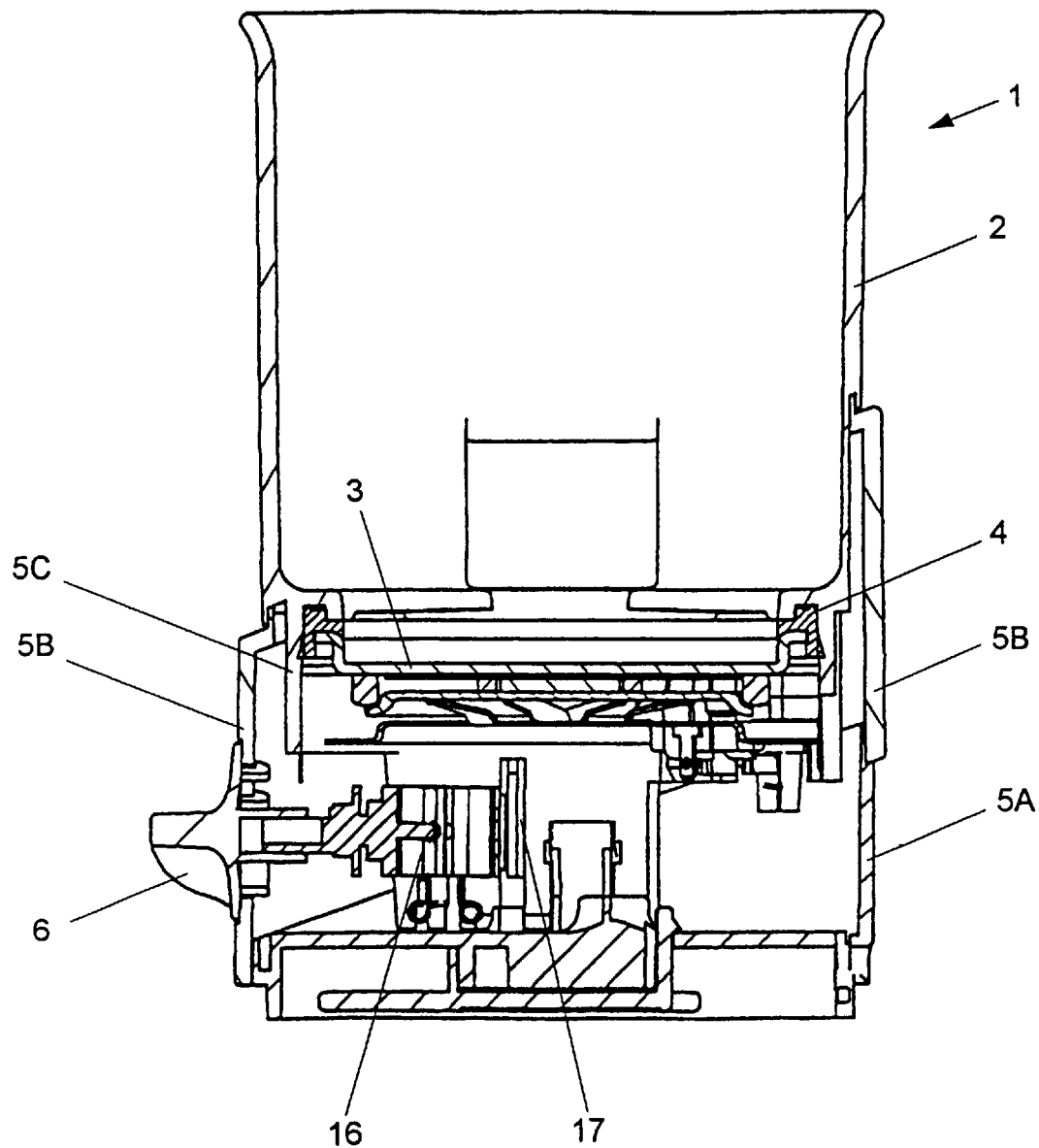
FIG. 1 shows a longitudinal section through the whole device.

Referring to FIG. 1, the warming device according to the present invention comprises a cup 1 with sidewalls 2 of plastic material and with a bottom plate 3 consisting of a metal suitable for heat transfer, e.g. aluminium with an anodized or coated surface. The bottom plate 3 has a circular shape and the outer edge thereof is provided with a bent peripheral edge. When the warming device is being assembled, the bottom plate is inserted in adequately shaped recesses provided in the lateral wall of the cup. Said recesses have provided therein an annular silicone packing 4, the bottom plate being pressed into said silicone packing whereby good sealing properties are achieved.

Three ribs project radially inwards from the lateral walls of the cup. The axial distance between the ribs and the bottom plate 3 is approx. 1 cm. The length of the ribs is approximately one quarter of the diameter of the cup 1.

The warming device is accommodated in a three-part housing 5 consisting of lower housing components 5A, 5B and of an upper housing component 5C. The upper housing component comprises the sidewalls 2 of the cup and reception means for the heating plate and the essential parts of the electric heating. The housing component 5B has essentially the shape of a hollow cylinder and one side thereof is provided with a circular opening for a turning knob 6. The turning knob is provided with snap projections, which are snapped in position in the housing, whereby said turning knob is rotatably guided in said housing. Finally, the housing 5 comprises a base 5A provided with cable support means and with strain relief means for a connecting lead. The three housing components are constructed such that they can be placed one on top of the other during assembly and that they are connected to one another by means of arresting hooks or similar connecting means.

Referring to FIGS. 3A and 3B, the essential parts of the electric heating will now be explained. In said figures, the upper housing component 5C is shown in two views which are displaced by 90°. The silicone packing 4 and the bottom plate 3 of the cup are shown below the upper housing component. Reference numeral 7 refers to a threefold, thin insulating foil consisting of Kapton and extending between the metallic bottom plate 3 and an upper electrode 8. The electrode 8 is a contact sheet with bent ends carrying connection lugs for stranded wires. Said upper electrode 8 and a lower electrode 10 have provided between them a PTC element 9 as well as a plastic frame 11 for supporting the pair of electrodes and the intermediate PTC element. As can be seen most clearly from FIG. 3A, the lower electrode 10 comprises a central flat area, which abuts flat on the lower side of the PTC element and which is followed by curved areas; at the ends of said curved areas two mounting surfaces are formed. Said mounting surfaces are directly placed on the bottom plate 3, whereby the heat transfer from the lower electrode to said bottom plate is improved, the Kaptan foil extending, however, between said mounting surfaces and said bottom plate. The curved portions increase the contact pressure between the electrode 10 and the PTC element 9 in an advantageous manner and guarantee an intimate contact between the electrodes and the PTC element.

Finally, reference numeral 12 refers to a sheet-metal spring 12, which is adapted to be inserted in the upper housing component and which, when inserted, will hold the above-described electric parts in close contact with one another The sheet-metal spring 12 is provided with two stabilizing, bent longitudinal edges whose end portions are snapped in position in suitable openings 13.

Figure 2:
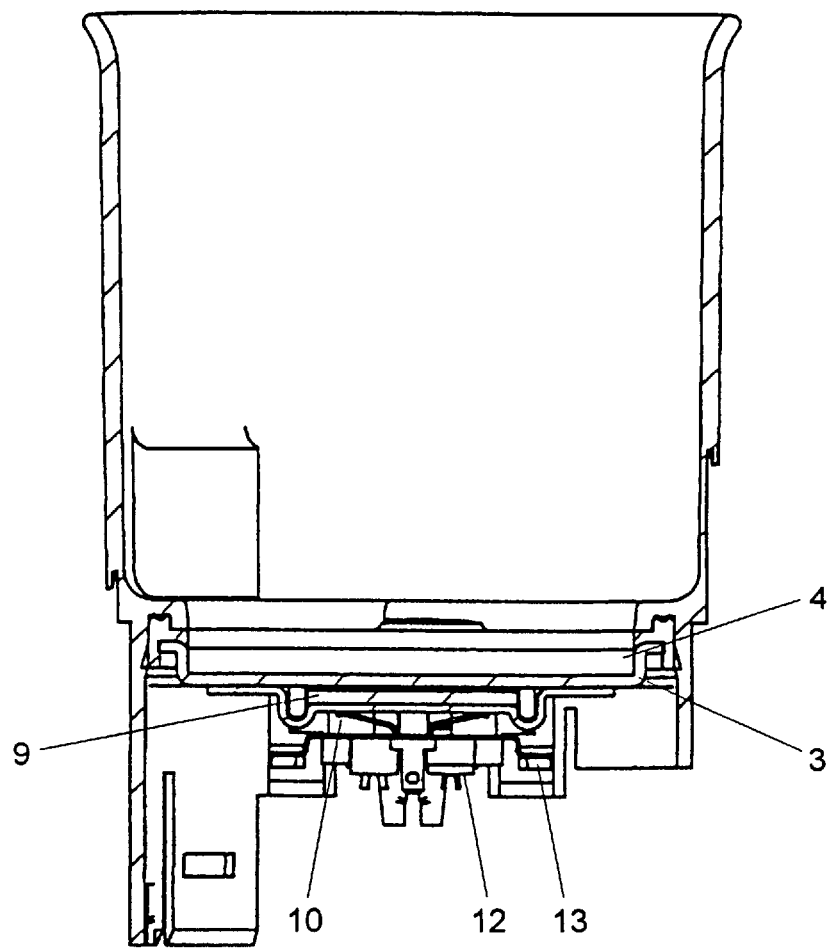
FIG. 2A shows a longitudinal section through the upper housing component and through essential parts of the electric heating.
FIG. 2B shows a view of the same parts which are shown in FIG. 2A, the longitudinal section being now carried out at a location which is displaced by 90° relative to the section according to FIG. 2A.
FIG. 2C shows a longitudinal section displaced by 45° relative to the longitudinal section shown in FIG. 2A, FIGS. 3A and 3B show, in an exploded view, two 90° displaced side views of the upper housing component and essential parts of the heating in a non-assembled condition.
Figure 2:
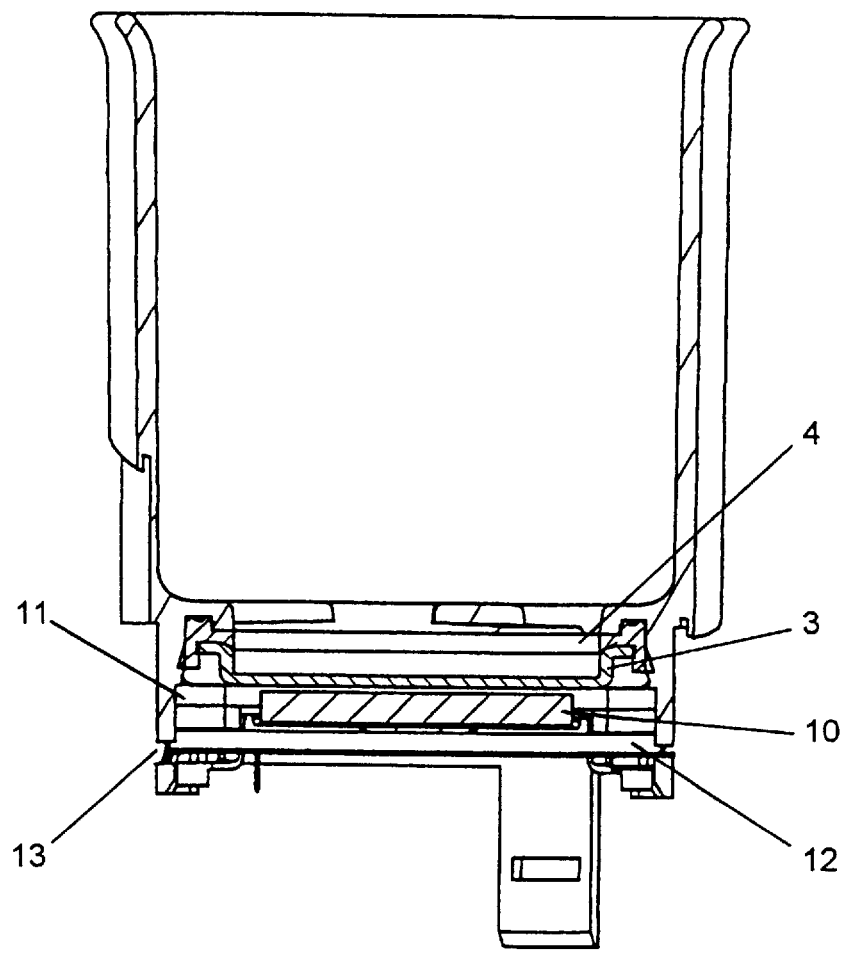
Figure 2:
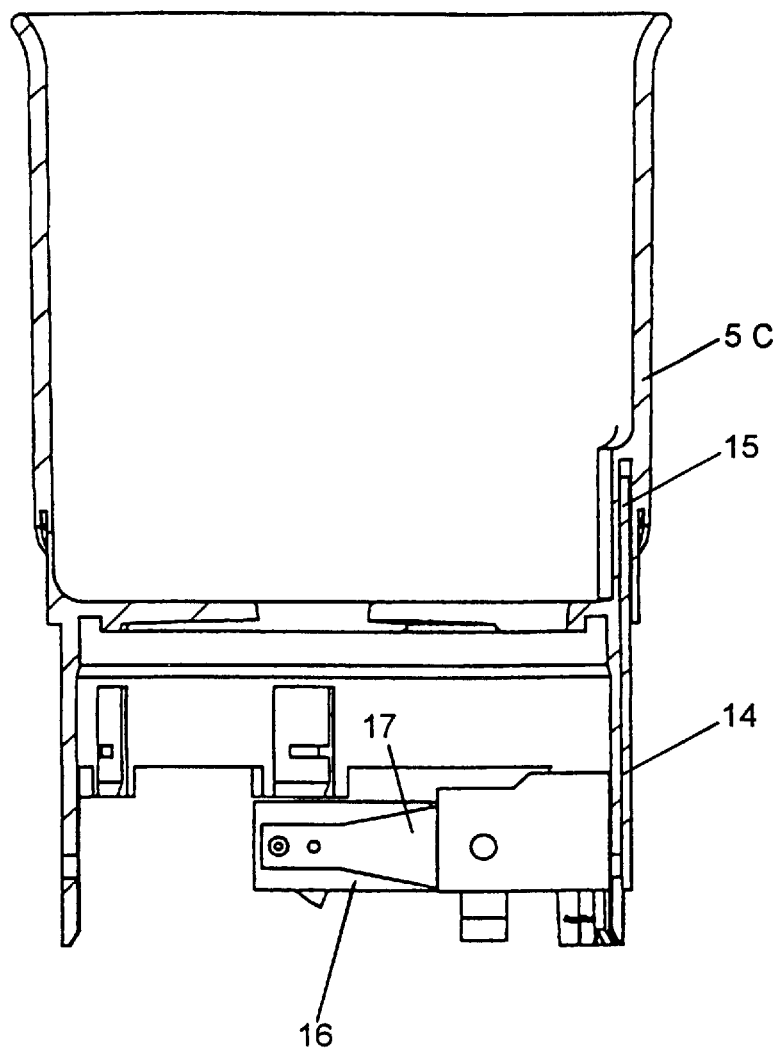
Figure 3:
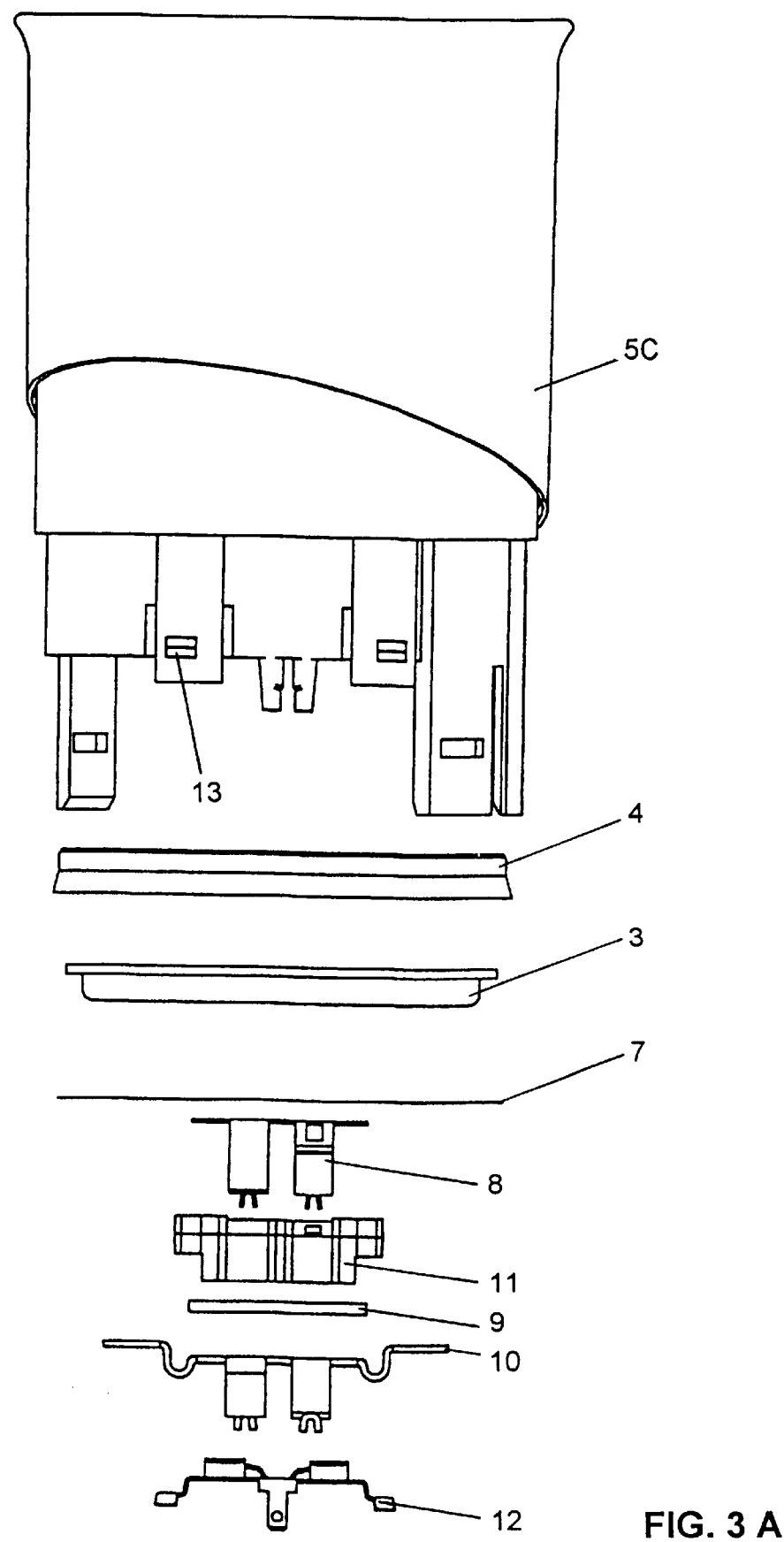
Figure 3:
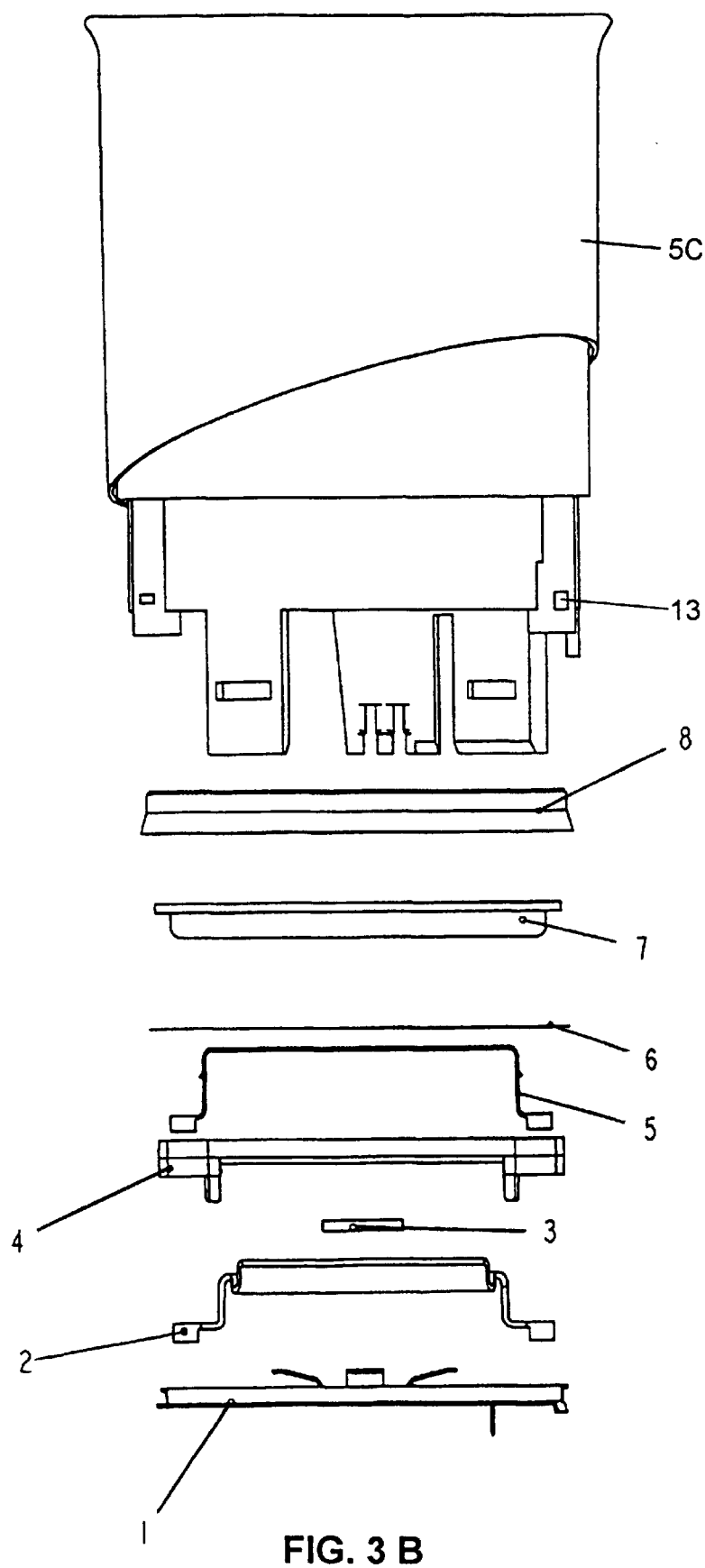

The views according to FIG. 2A and 2B correspond to those according to FIG. 3A and 3B, respectively; in FIG. 2 the heating is shown in a condition in which it is fully mounted in the upper housing component, whereas in the exploded view according to FIG. 3 the parts are shown separately for the sake of clearness.

FIG. 2C shows a view in which a heat-conducting member 14 can be seen, which extends laterally on the outer wall of the upper housing component 5C. The upper end of the heat-conducting member is inserted in a pocket 15 formed axially in the cup wall. On the inner side of the cup, an additional plastic layer having a thickness of approx. 1 mm is provided, which serves to the retard the heat transfer between the water bath and the heat-conducting member 14. The lower end of the heat-conducting member 14 is provided with a connecting portion which is bent at an angle of approx. 90° and which has secured thereto a thermostat switch 16 with a bimetal spring element 17. The position of the thermostat switch relative to the heating element is clearly shown in FIG. 1. Being located at a distance of approx. 2 cm, the thermostat switch is arranged in an area in which it is directly influenced by the heating element.

Figure 4:
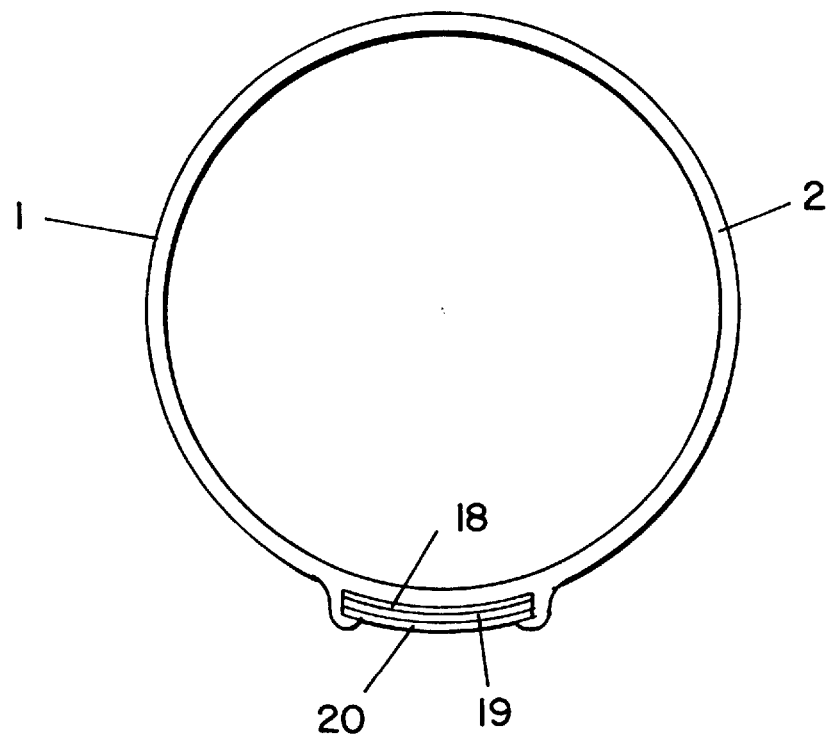
FIGS. 4 and 5 show a top view and a side view of the upper cup component in accordance with a preferred embodiment of the present invention.
Figure 5:
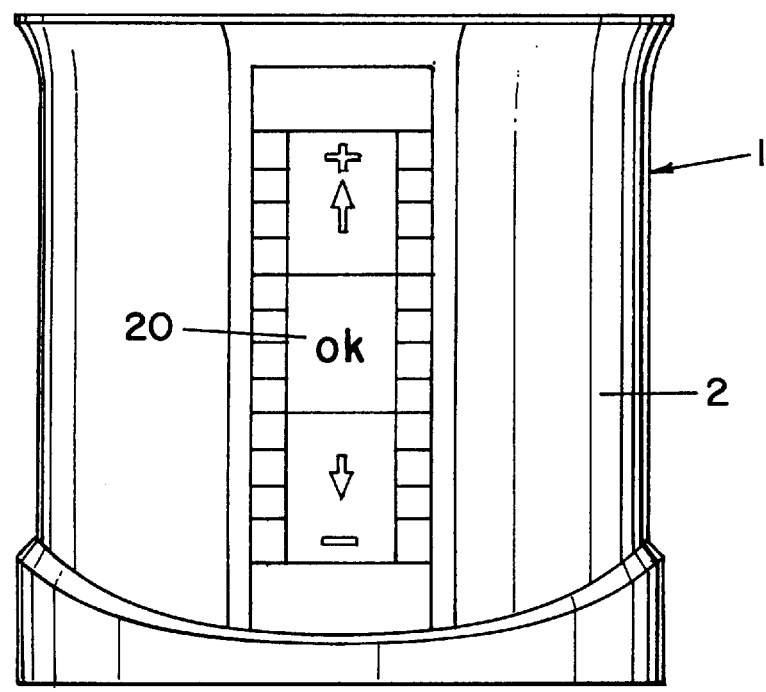

FIGS. 4 and 5 show a top view and a side view of the upper cup component having a temperature indicator applied thereto. A metal strip 18, which is preferably made from aluminium, extends directly on the outer wall of the cup in the vertical direction. The strip of aluminium is slightly curved in its transverse direction and is, consequently, adapted to the outer radius of curvature of the cup wall. In view of the fact that the temperature measuring element is attached to the outer wall of the cup, a heat insulation having a thickness of material of approx. 1 mm is provided between said element and the water bath. It must, however, be emphasized that also a different value may be chosen for the thickness of material of the plastic insulation so as to obtain a suitable adjustment of the temperature shown to the actual temperature of the substance to be warmed up. It follows that, depending on the heat insulation of the cup and the substance to be warmed up, the wall thickness of the cup can be reduced or increased at this point.

An LCD temperature-indicating paint element 19 is placed flat on the surface of the metal strip, the front of said LCD temperature-indicating paint element 19 being provided with a foil which is adapted to be printed or with a shaped part 20. LCD temperature-indicating paint elements are equipped with temperature-indicating paints (thermopaints) which change their colour in response to the temperature. By means of these paints, the temperature and the temperature distribution over comparatively large surfaces can be determined. The metal strip, the temperature-indicating element and the printable foil are secured to the outer wall of the cup by means of retaining projections integrated in the cup wall.

In the following, the mode of operation of the warming device according to the present invention will be explained.

When the warming device is in operation, a receptacle containing the substance to be heated is put in the cup, said receptacle resting on the ribs which project radially inwards. When the heating process is started, the water bath, the heat-conducting member 14 and the bimetal spring element 17 will normally have the ambient temperature. The operator of the warming device adjusts by means of the turning knob 6 an end temperature, which is higher than the ambient temperature, at the thermostat switch. Said thermostat switch will then establish an electric connection between the heating element and the connecting lead, whereby the heating will be switched on. This will have the effect that the PTC element warms up in a known manner. The power consumption of the heating element is much higher in the cold condition, since the resistance value of the heating element increases rapidly as the temperature increases. Due to the fact that the PTC heating element heats up, the electrodes 8 and 10, which are in direct contact with said PTC heating element, heat up as well. The heat is given off to the heating plate 3 where it will warm up the water bath and the receptacle located in said water bath and containing the substance to be warmed up.

From the point of view of control engineering, the thermostat switch 16 provided with the bimetal spring element 17 is an on-off controller with a switching hysteresis, said on-off controller having an upper and a lower threshold value. When the upper threshold value is reached, the thermostat switch will interrupt the electric connection of the heating element to the connecting lead, and when the temperature of the bimetal spring element falls below the lower threshold value, the connection will be re-established.

During the initial heating phase, the switching characteristics of the thermostat switch are essentially determined by the temperature of the heat-conducting member. Initially, the temperature of said heat-conducting member will correspond to the ambient temperature, since said heat-conducting member warms up only gradually as the temperature of the water bath increases. The plastic insulation of the heat-conducting member in the area of the inner side of the cup additionally guarantees that the heating of the heat-conducting member will lag behind the heating of the water bath. It follows that, in this phase, the thermostat switch receives from the heat-conducting member a temperature signal indicating a temperature which is lower than the temperature of the water bath. Hence, the controller is "deluded" into assuming that a temperature exists which is lower than the actual temperature. The heat emitted at this time by the lower electrode 10 and the sheet-metal spring 12 connected thereto does not suffice to switch off the thermostat switch, since said thermostat switch still receives a low temperature signal via the heat-conducting member at this time. The thermostat switch will therefore not switch off, and the heating element will continue to heat, whereby it will even be possible to produce in the water bath a temperature which is higher than the desired end temperature. This "overshoot" of the water bath temperature will result in very rapid heating.

When the heating has been switched on for a certain period, the heat-conducting member will have heated to a temperature close to the desired end temperature. In view of the fact that the bimetal spring element is additionally located in an area where it is directly influenced by the PTC heating element, the temperature influence of the heat-conducting member and the direct thermal radiation will superimpose, whereby the bimetal spring element will reach the upper limit value. This will have the effect that the on-off controller will interrupt the electric connection to the PTC heating element, whereby the direct thermal radiation will disappear very rapidly as well. Hence, the temperature of the bimetal spring element will drop comparatively rapidly until it falls below the lower limit value whereupon the heating will be switched on again. This switching on and off takes place frequently, since the direct thermal radiation acts on the controller with little delay. The frequent switching on and off is a visible sign of the fact that the end temperature reached is maintained within close temperature limits.

As has already been described hereinbefore, the switching characteristics of the thermostat switch are essentially determined by the temperature of the heat-conducting member during the initial heating phase, whereas, when the end temperature has been reached, the direct thermal radiation of the PTC heating element will cause the temperature to reach the upper and lower limit values of the on-off controller. It follows that these two influencing quantities must be adjusted well; in other words, a suitable weighting for supplying the two actual-value temperature signals to the controller must be found. Said weighting can be varied, e.g. with the aid of the distance of the thermostat switch from the heating element, the thickness of the material of the heat-conducting member, the surface of the bimetal spring element as well as the orientation of said bimetal spring element with respect to the PTC heating element, and, finally, the thermal coupling between the heat-conducting member and the thermostat switch.

In the embodiment described in the present connection, a suitable adaptive adjustment is achieved by the features that the distance between the thermostat switch and the heating element is approx. 2 cm, that the bimetal spring element has a surface of approximately 2 cm$^2$ and is arranged perpendicularly to the lower electrode, that the thickness of the material of the heat-conducting member is 1.5 mm, and that thermal coupling between the heat-conducting member and the bimetal spring element takes place on an overlapping area of 1 cm$^2$.

In addition, also the time response of the two temperature sensors must be adjusted in a suitable manner so that the superposition of the actual-value signals will cause the desired control behaviour. As has already been mentioned hereinbefore, it is important to couple a fast-response temperature sensor and a sensor with a comparatively slow response, the slow-response sensor determining the switching behaviour during the heating phase and the fast-response sensor determining the switching of the controller when the end temperature is reached.

To the person skilled in the art it will be obvious that, in the present embodiment, the thermal conductivity and the transition resistances (especially the plastic insulation on the inner side of the cup) are parameters which will influence the temporal temperature behaviour of the heat-conducting member. In the case of the fast-response sensor, the PTC heating element used (end temperature, power, number and mode of arrangement of the elements) is of essential importance.

Hence, it must be emphasized that the parameters described hereinbefore should not be regarded as absolute values, but that the gist of the present invention is to be seen in a suitable adaptive adjustment of the physical quantities on the basis of which the above-described switching charactersitics of the controller will be obtained.

An essential advantage existing when the warming device according to the present invention is in operation is the provision of a temperature indicator indicating essentially the temperature of the substance to be heated. As has been described hereinbefore, the temperature of the substance to be warmed up lags behind the temperature of the water bath, since the heat insulation of the receptacle for the substance to be warmed up must first be overcome. Also the temperature at the outer wall of the cup will only rise after a specific period of time, which is necessary for heating up the cup wall. Provided that the material of the cup wall has an adequately dimensioned thickness, the temporal behaviour of the temperature at the outer wall of the cup will essentially correspond to the temperature of the substance to be warmed up.

In view of the thermal convection, the temperature of the water bath in the upper layers is higher than the temperature of the lower water layers. This results in a non-uniform temperature distribution on the outer wall of the cup, i.e. the temperature of the outer wall increases in proportion to an increase in the distance from the bottom plate of the cup. The metal strip 18 which consists of aluminium and which is attached to the outer wall guarantees that the temperature gradient will rapidly be equalized. Hence, the temperature indicating element will measure a temperature which has been rendered uniform across the surface of the metal strip.

It is evident that the temperature indiactor offers the user of the warming device various advantages. For example, if the user wants heating within a very short period of time, he can adjust a very high end temperature and stop the heating process by removing the receptacle when the indicator has reached the desired temperature. Furthermore, the desired temperature will be obtained even more precisely, if the user supervises, when the end temperature has been reached, the unavoidable variations of the end temperature within the tolerance limits by means of an optical indicating device, and removes the receptacle containing the substance to be warmed up from the warming device at a specific moment.

I claim:

1. An electrically heatable warming device for warming up substances contained in a receptacle, comprising:

a cup which serves as a water bath and into which the receptacle can be introduced, the bottom of said cup being a metallic heating plate;

an electric heating element of at least one PTC element arranged directly below said heating plate;

a thermostat switch at a location close to said heating element to be directly influenced by said heating element; and a heat-conducting member arranged laterally on said cup wall and connected to said thermostat switch.

2. A warming device according to claim 1 wherein said device is provided with a housing of plastic material whose upper component defines the lateral walls of said cup.

3. A warming device according to claim 1 wherein said lateral walls of said cup are provided with ribs which project radially inwards and the length of which is not treater than one quarter of the diameter of said cup, said ribs being arranged at an axial distance of approx. 0.5 to 1.5 cm from said cup heating plate.

4. A warming device according to claim 1 wherein said heat-conducting member is inserted in a pocket formed axially in a said wall of said cup, the thickness of the pocket side facing the inner side of said cup being about 1 mm.

5. A warming device according to claim 1 wherein said PTC element is arranged between two contact sheets serving as electrodes, and wherein said heating plate is placed on top of one of said contact sheets with an insulating foil extending between said heating plate and said one contact sheet.

6. A warming device according to claim 5, further comprising a sheet-metal spring on said housing which produces a spring force pressing said contact sheets towards one another and holding them in contact with said heating plate.

7. A warming device according to claim 6, wherein said sheet-metal spring has two opposed, bent longitudinal edges whose end portions are snapped in position in said housing, and the area located between said longitudinal edges has a plurality of bent-out flexible tongues.

8. A warming device according to claim 1, wherein said thermostat switch is provided with a bimetal spring element connected to said heat-conducting member, and said PTC heating element and the bimetal spring element are located at a distance of about 2 cm from one another.

9. A warming device according to claim 2, further comprising a temperature measuring element attached to the outer side of said cup in thermal contact with a wall of said cup.

10. A warming device according to claim 9, wherein said temperature measuring element is a temperature-indicating paint foil which indicates the temperature distribution across a section of the outer wall of said cup.

11. A warming device according to claim 9 further comprising a metal strip arranged between a said cup wall and said temperature measuring element.

* * * * *